United States Patent
Tohmoto et al.

[11] Patent Number: 5,853,769
[45] Date of Patent: Dec. 29, 1998

[54] CENTER MECHANISM OF A TIRE VULCANIZER

[75] Inventors: Keiichi Tohmoto; Toshifumi Murakami, both of Nagasaki, Japan

[73] Assignee: Mitsubishi Heavy Industries, Ltd., Tokyo, Japan

[21] Appl. No.: 889,176

[22] Filed: Jul. 7, 1997

[30] Foreign Application Priority Data

Sep. 3, 1996 [JP] Japan ..................... 8-233163

[51] Int. Cl.$^6$ .................... B29C 33/30; B29C 35/02; B29C 35/16
[52] U.S. Cl. .................... 425/38; 425/40; 425/48; 425/50; 425/52; 425/400
[58] Field of Search .................... 425/38, 40, 48, 425/52, 58, 400, 42, 50, 28.1

[56] References Cited

U.S. PATENT DOCUMENTS

| | | | |
|---|---|---|---|
| 3,632,712 | 1/1972 | Miller | 425/40 |
| 4,768,937 | 9/1988 | Singh | 425/38 |
| 5,106,280 | 4/1992 | Sakaguchi | 425/38 |

FOREIGN PATENT DOCUMENTS

| | | |
|---|---|---|
| 58-66934 | 8/1983 | Japan . |
| 3-274113 | 12/1991 | Japan . |

*Primary Examiner*—Jay H. Woo
*Assistant Examiner*—Robert Hopkins
*Attorney, Agent, or Firm*—Michael N. Meller

[57] ABSTRACT

A center mechanism of a tire vulcanizer in accordance with the present invention has an upper clamp ring for holding the upper opening end of a bladder, a lower clamp ring for holding the lower opening end of the bladder, a lower ring on the lower mold side supporting the lower clamp ring, a spacer installed to the lower ring and having a ventilating portion, and a center post elevating cylinder installed to the spacer. The extending portion of piston rod of the center post elevating cylinder is made a center post, the center post is inserted, in such a manner as to be movable vertically, into a through hole formed in the center of the lower ring and the lower clamp ring, and the upper clamp ring is fixed to the upper end portion of center post protruding upward from the through hole of the lower clamp ring.

2 Claims, 3 Drawing Sheets ed, 5,853,769

CENTER MECHANISM OF A TIRE VULCANIZER

FIELD OF THE INVENTION AND RELATED ART STATEMENT

The present invention relates to a center mechanism of a tire vulcanizer.

A conventional center mechanism of a tire vulcanizer (for example, the center mechanism of a tire vulcanizer disclosed in Japanese Utility Model Provisional Publication No. 58-66934 (No. 66934/1983)) will be described with reference to FIG. 2. In the figure, reference character B denotes a bladder, 101 denotes an upper clamp ring for holding the upper opening end of the bladder B, 102 denotes a center post detachably fixing the upper clamp ring 101 at the upper end portion thereof, 103 denotes a lower clamp ring for holding the lower opening end of the bladder B, 104 denotes a lower ring detachably fixing the lower clamp ring 103, 105 denotes a center post elevating cylinder, 106 denotes a second piston rod for the center post elevating cylinder 105, and 107, 108, and 109 denote seal members. The center post 102 is fixed to a piston 105a of the center post elevating cylinder 105, and the second piston rod 106 is fitted on the outer periphery of the center post 102 and inserted, in such a manner as to be movable vertically, into a through hole formed in the center of the lower ring 104. The second piston rod 106 has a function of restricting the elevation stroke of the center post 102.

Because tire vulcanization is carried out at a high temperature close to 200° C., the center post elevating cylinder 105 is heated to a high temperature. Therefore, the seal members 107 and 108 are worn, and a heating/pressurizing medium (hot water, steam, or a mixed gas of steam and inert gas) supplied into the tire via the bladder B leaks in the direction of the center post elevating cylinder 105, and enters the cylinder 105; therefore, a trouble such as damage to a pipe occurs. In particular, since inert gas was used as the heating/pressurizing medium, the frequency of trouble occurrence has increased suddenly.

Accordingly, there is a tendency to use a center mechanism of a tire vulcanizer shown in FIG. 3 (for example, the center mechanism of a tire vulcanizer disclosed in Japanese Patent Provisional Publication No. 3-274113 (No. 274113/1991)). In FIG. 3, reference character T denotes a tire being vulcanized, B denotes a bladder, 201 and 203 denote upper and lower clamp rings for holding the upper and lower opening ends of the bladder B, respectively, 204 denotes a lower ring detachably fixing the lower clamp ring 203, and 202 denotes a center post inserted, in such a manner as to be movable vertically, into a through hole formed in the center of the lower ring 204. To the upper end portion of the center post 202 is detachably fixed the upper clamp ring 201.

Reference numeral 207 denotes a seal member interposed between the lower ring 204 and the center post 202, 205 denotes a center post elevating cylinder fixed to the lower ring 204 via a spacer 206. The upper end of a piston rod 205a of the cylinder 205 is connected to the lower end of the center post 202 by screwing.

In the center mechanism of a tire vulcanizer shown in FIG. 3, the presence of the spacer 206 can decrease the amount of heat transfer to the center post elevating cylinder 205. Also, a pipe (not shown) is connected to the spacer 206 so that the heating/pressurizing medium leaking due to wear of the seal member 207 can be discharged to the outside of the machine through the pipe connected to the spacer 206. Therefore, the inflow of the heating/pressurizing medium into the center post elevating cylinder 205 can be eliminated completely, so that the above problem can be solved. Also, a hydraulic oil can be used as a working fluid for the center post elevating cylinder 205. On the other hand, however, it is necessary to make the spacer 206 longer than the elevation stroke of the center post 202. Therefore, the center mechanism of a tire vulcanizer shown in FIG. 3 has a problem in that the installation pit for the tire vulcanizer must be deeper by the length of the spacer 206.

OBJECT AND SUMMARY OF THE INVENTION

The present invention was made to solve the above problems, and accordingly an object thereof is to provide a center mechanism of a tire vulcanizer, in which the depth of installation pit for the tire vulcanizer can be decreased significantly.

To achieve the above object, the present invention provides a center mechanism of a tire vulcanizer, having an upper clamp ring for holding the upper opening end of a bladder, a lower clamp ring for holding the lower opening end of the bladder, a lower ring on the lower mold side supporting the lower clamp ring, a spacer installed to the lower ring and having a ventilating portion, and a center post elevating cylinder installed to the spacer, in which the extending portion of piston rod of the center post elevating cylinder is made a center post, the center post is inserted, in such a manner as to be movable vertically, into a through hole formed in the center of the lower ring and the lower clamp ring, and the upper clamp ring is fixed to the upper end portion of center post protruding upward from the through hole of the lower clamp ring (claim 1).

In the center mechanism of a tire vulcanizer according to claim 1, the piston rod of the center post elevating cylinder and the center post may be formed integrally (claim 2).

In the center mechanism of a tire vulcanizer according to claim 1, the lower end portion of the spacer may be connected to a flange provided at the vertical intermediate position of the center post elevating cylinder (claim 3).

A tire vulcanizer may be one having a center mechanism according to any one of claims 1 to 3 (claim 4).

A center mechanism of a tire vulcanizer in accordance with the present invention has an upper clamp ring for holding the upper opening end of a bladder, a lower clamp ring for holding the lower opening end of the bladder, a lower ring on the lower mold side supporting the lower clamp ring, a spacer installed to the lower ring and having a ventilating portion, and a center post elevating cylinder installed to the spacer. The extending portion of piston rod of the center post elevating cylinder is made a center post, the center post is inserted, in such a manner as to be movable vertically, into a through hole formed in the center of the lower ring and the lower clamp ring, and the upper clamp ring is fixed to the upper end portion of center post protruding upward from the through hole of the lower clamp ring. Since the extending portion of piston rod of the center post elevating cylinder is made a center post, the distance between the lower ring and the center post elevating cylinder can be decreased. In addition, since the spacer is provided with the ventilating portion to accelerate heat dissipation, there is no need for increasing the length of the spacer, so that the depth of installation pit for the tire vulcanizer can be decreased significantly.

DETAILED DESCRIPTION OF PREFERRED EMBODIMENTS

A center mechanism of a tire vulcanizer in accordance with the present invention will be described below with reference to one embodiment shown in FIG. 1.

Figure 1:
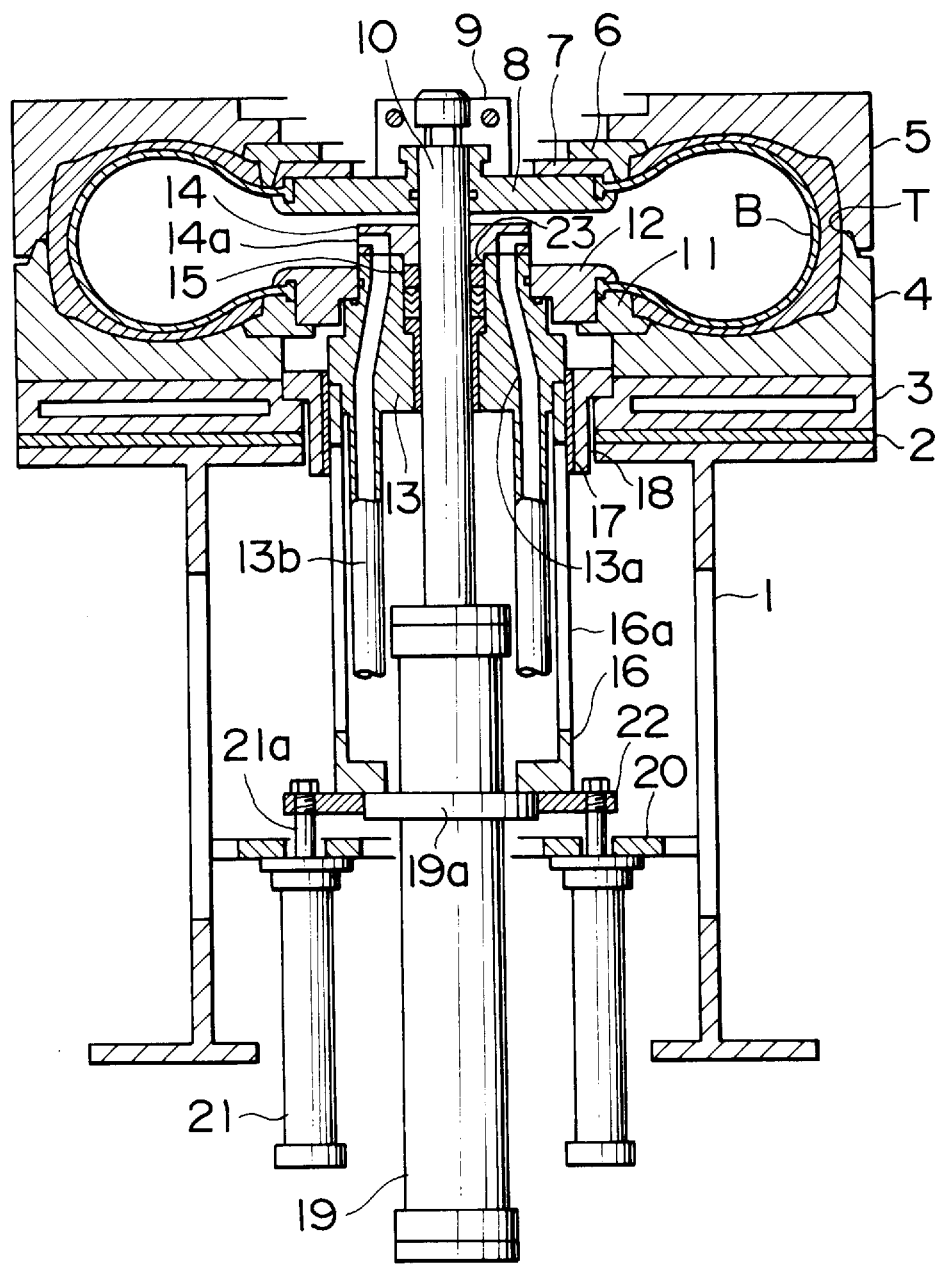
FIG. 1 is a longitudinal side sectional view showing one embodiment of a center mechanism of a tire vulcanizer in accordance with the present invention.
Figure 2:
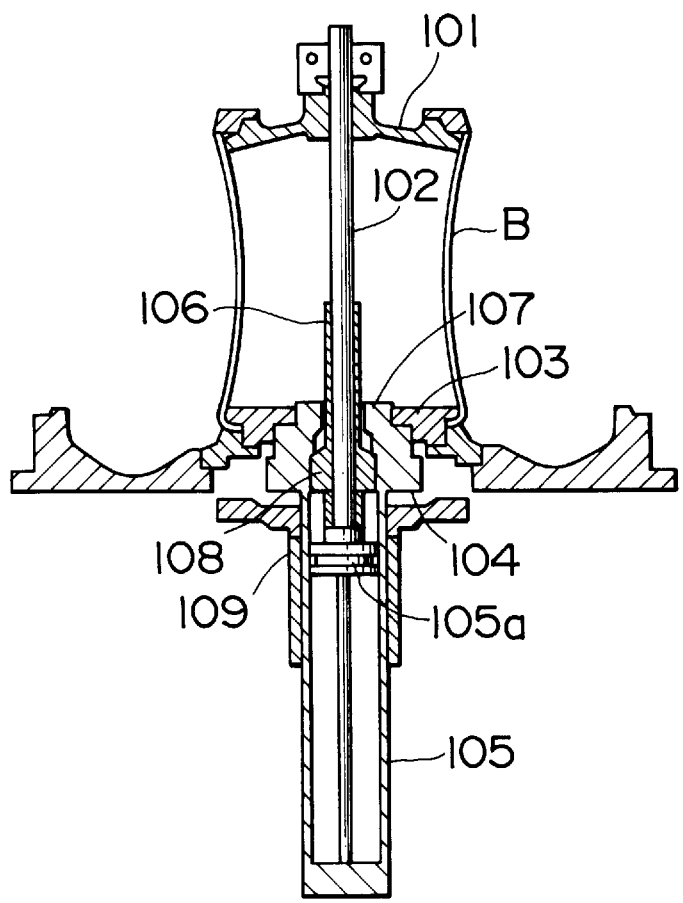
FIG. 2 is a longitudinal side sectional view showing one example of a conventional center mechanism of a tire vulcanizer.
Figure 3:
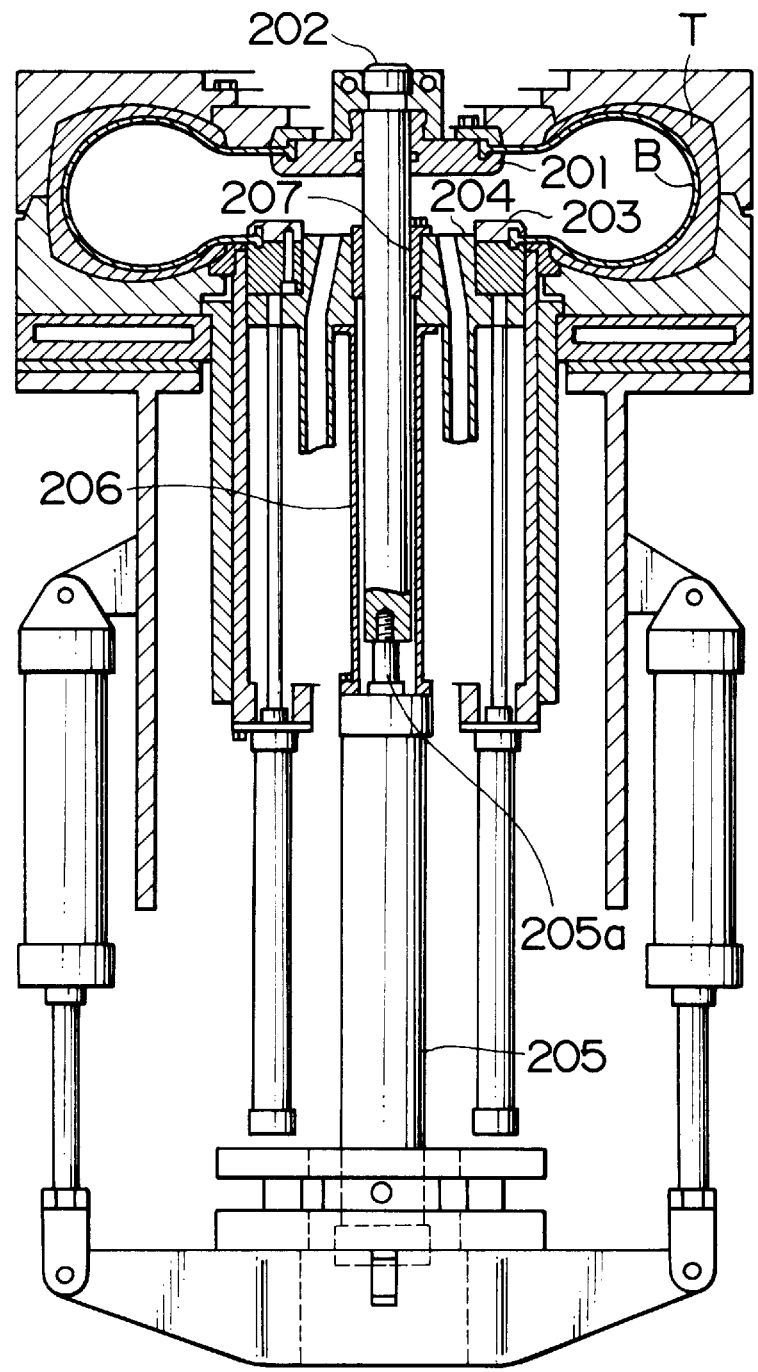
FIG. 3 is a longitudinal side sectional view showing another example of a conventional center mechanism of a tire vulcanizer.

In FIG. 1, reference character T denotes a tire being vulcanized, B denotes a bladder, 1 denotes a base for a tire vulcanizer body frame, 3 denotes a lower hot plate fixed to the base 1 via a heat insulating plate 2 by means of bolts etc., 4 denotes a lower mold fixed to the lower hot plate 3 by means of bolts etc., 5 denotes an upper mold fixed to a bolster plate (not shown), which is assembled to the body frame in such a manner as to be movable vertically, via the heat insulating plate 2 and the upper hot plate (not shown) by means of bolts etc., and 6 denotes an upper bead ring bolted to the upper mold 5.

Reference numeral 8 denotes an upper clamp ring for holding the upper opening end of the bladder B. By bolting a clamp plate 7 to the upper clamp ring 8, the upper opening end of the bladder B can be held.

Reference numeral 9 denotes a lock ring capable of being divided into two pieces in the circumferential direction, 10 denotes a center post (a piston rod of a center post elevating cylinder 19) fixing the upper clamp ring 8 at the upper end portion thereof. The upper clamp ring 8 is fitted onto the upper end portion of the center post 10, and unified by bolting the two-piece lock ring 9. A seal member is interposed between the center post 10 and the upper clamp ring 8.

Reference numeral 12 denotes a lower clamp ring for holding the lower opening end of the bladder B. By bolting the lower bead ring 11 to the lower clamp ring 12, the lower opening end of the bladder B can be held.

Reference numeral 13 denotes a lower ring fixing the lower clamp ring 12 by screwing at the outer periphery thereof. A seal member is interposed between the lower ring 13 and the lower clamp ring 12.

Reference numeral 15 denotes an assembly of a seal member and a bushing, inserted in the inner peripheral portion of the lower ring 13. The assembly 15 is prevented from coming off by a flange 14 bolted to the lower ring 13. In the seal member-and-bushing assembly 15, the center post 10 is inserted in such a manner as to be movable vertically. That is, a through hole 23 for inserting the center post 10 is formed in the center of the lower ring 13 and the lower clamp ring 12.

The upper end of a heating/pressurizing medium passage 13a provided in the lower ring 13 is connected to the interior of the bladder B via a nozzle 14a provided in the flange 14, and the lower end of the heating/pressurizing medium passage 13a is connected to a heating/pressurizing medium supply/discharge device (not shown) via a pipe 13b fixed by screwing etc.

Reference numeral 16 denotes a spacer fixed to the outer periphery of the lower ring 13 by screwing etc. At the vertical intermediate portion of the spacer 16, a ventilation window 16a, which is a ventilating portion, for effecting ventilation is provided. Ventilation may be effected by using a cooling fan or the like.

Reference numeral 19 denotes a center post elevating cylinder provided with a flange 19a at the vertical intermediate portion thereof. The flange 19a of the cylinder 19 and the lower end portion of the spacer 16 are bolted to each other. Therefore, by actuating the center post elevating cylinder 19 to raise/lower the center post (the piston rod of the center post elevating cylinder 19), the bladder B can be expanded or contracted vertically.

Reference numeral 18 denotes a guide tube provided at the inner periphery of the lower hot plate 3. A bushing 17 is inserted in the guide tube 18 and fixed to the inner periphery thereof. Inside the bushing 17, the lower ring 13 integral with the spacer 16 is inserted in such a manner as to be movable vertically.

Reference numeral 21 denotes a bead lift cylinder bolted to a bracket 20 fixed to the base 1. The upper end of a piston rod 21a of the bead lift cylinder 21 is connected to a flange 22 of the spacer 16. Therefore, by actuating the bead lift cylinder 21, the center post elevating cylinder 19, spacer 16, lower ring 13, and lower bead ring 11 can be raised or lowered.

Next, the operation of the center mechanism of a tire vulcanizer shown in FIG. 1 will be described in detail.

During the tire vulcanization, the upper part of the center post 10, lower ring 13, etc. come in contact, via the bladder B, with the heating/pressurizing medium supplied into the interior of the tire T, so that these elements are heated to a temperature close to 200° C. This heat of about 200° C. is dissipated from the portion of center post 10 protruding below the lower ring 13, so that the temperature lowers before the heat reaches the center post elevating cylinder 19.

At this time, the heat dissipation is accelerated by the ventilation through the ventilation window 16a provided in the spacer 16, and the amount of heat transfer through the spacer 16 decreases. Therefore, the temperature of the center post elevating cylinder 19 becomes a temperature lower than the allowable temperature for the working fluid of the cylinder 19 and the seal member.

The distance between the center post elevating cylinder 19 and the lower ring 13 is predetermined so that the temperature of the center post elevating cylinder 19 is not higher than the allowable temperature for the working fluid of the cylinder 19 and the seal member.

Upon completion of vulcanization of the tire T, the heating/pressurizing medium in the tire T is discharged in the same manner as the conventional manner, and then the upper mold 5 is raised. The interior of the bladder B is made vacuum, and the center post elevating cylinder 19 is actuated, whereby the upper clamp ring 8 is raised to extend the bladder B while decreasing the diameter thereof to remove the tire T.

Then, the bead lift cylinder 21 is actuated to raise the lower bead ring 11, whereby the tire T is separated from the lower mold 4 and raised. The tire T is taken out of the machine by conventional means, and a tire T to be vulcanized next is loaded.

Subsequently, the loaded tire T is shaped, and the upper mold 5 is lowered. After the mold is closed, the heating/pressurizing medium is poured into the tire T via the bladder B. Thus, the vulcanization process is started, and the above operation is repeated.

The above description has been for the case in which the invention is applied to a center mechanism of a tire vulcanizer of a type such that the bladder B is extended while decreasing the diameter thereof in loading/unloading the tire. However, the present invention can be applied to a center mechanism of a tire vulcanization of other types, for example, to a center mechanism of a tire vulcanization of a type such that the bladder B is stored in a well in loading/ unloading the tire.

We claim:

1. A center mechanism of a tire vulcanizer comprising, an upper clamp ring for holding the upper opening end of a bladder, a lower clamp ring for holding the lower opening end of the bladder, a lower ring for supporting said lower clamp ring, a spacer having an upper end portion connected to said lower clamp ring and having a lower end portion connected to an hydraulic center post elevating cylinder, said hydraulic cylinder having a vertically aligned movable piston rod forming, when extended, the center post for the center mechanism, with said center post extending through an opening in both the center of said lower ring and said lower clamp ring to said upper clamp ring and means connecting the upper end of said center post to said upper clamp ring wherein said spacer includes a ventilating window located intermediate the upper and lower end portions thereof to dissipate heat from the center post to the atmosphere external of said bladder during the tire vulcanizing operation.

2. A center mechanism of a tire vulcanizer according to claim 1, wherein the lower end portion of said spacer is connected to a flange provided at the vertical intermediate position of said center post elevating cylinder.

* * * * *